TELEVISION RECORDING APPARATUS

Filed Oct. 12, 1948 6 Sheets-Sheet 1

Inventor
FRANK N. GILLETTE
RAYMOND L. GARMAN
LOUIS L. POURCIAU
By
R. A. Mackey
Attorney Inventor
FRANK N. GILLETTE
RAYMOND L. GARMAN
LOUIS L. POURCIAU
By H. S. Mackey
Attorney July 26, 1955 F. N. GILLETTE ET AL 2,714,131

TELEVISION RECORDING APPARATUS

Filed Oct. 12, 1948 6 Sheets-Sheet 3

Inventor
FRANK N. GILLETTE
RAYMOND L. GARMAN
LOUIS L. POURCIAU
H. A. Mackey
Attorney

TELEVISION RECORDING APPARATUS

Inventor
FRANK N. GILLETTE
RAYMOND L. GARMAN
LOUIS L. POURCIAU
By H. L. Mackey
Attorney

TELEVISION RECORDING APPARATUS

Filed Oct. 12, 1948

Inventor
FRANK N. GILLETTE
RAYMOND L. GARMAN
LOUIS L. POURCIAU
By H. S. Mackey
Attorney July 26, 1955 F. N. GILLETTE ET AL 2,714,131

TELEVISION RECORDING APPARATUS

Filed Oct. 12, 1948 6 Sheets-Sheet 6

Inventor
FRANK N. GILLETTE
RAYMOND L. GARMAN
LOUIS L. POURCIAU

By H. L. Mackey
Attorney

United States Patent Office 2,714,131

Patented July 26, 1955

2,714,131

TELEVISION RECORDING APPARATUS

Frank N. Gillette, Raymond L. Garman, and Louis L. Pourciau, Pleasantville, N. Y., assignors to General Precision Laboratory Incorporated, a corporation of New York Application October 12, 1948, Serial No. 54,042

12 Claims. (Cl. 178—7.4)

This invention relates to television recording apparatus and more particularly to apparatus whereby received television images are recorded on film for projection by standard motion picture projectors.

If the film strip on which the television picture is recorded is to be projected by a standard motion picture projector, the camera employed for the purposes of recording must include an intermittent which advances the film at a cyclic frequency of 24 motion picture frames a second, the film being exposed only during the period that the film is stationary. Such a camera is employed in the instant invention and an electronic shutter is provided which permits illumination of the television cathode ray tube screen and projection of its image upon a frame of the sensitized film beginning after a pulldown has been completed and ending before the succeeding pulldown commences. The positioning of this illumination period within the film stationary period may be termed phasing, and the bringing of the cyclic frequency of the illumination period into equality with the camera intermittent cyclic period may be termed synchronization.

Television screen pictures are delineated by a beam within the television cathode ray tube which draws or scans successive modulated horizontal lines until the entire picture area has been scanned, requiring according to present practice 525 lines, after which the process is immediately repeated.

It is of course obvious that, although the present invention employs circuits based upon the present standard of 525 lines per picture, these circuits could easily be modified by one skilled in the art for adaptation to another number of lines per picture, if the standard of the industry should be changed.

In the instant invention each of the 525 lines of a television picture is projected upon a particular horizontal linear portion of the sensitized film strip. If any line be missing, that portion of the film will be unexposed; if any line be drawn twice, that portion of the film will be doubly exposed and will exhibit a blurred and over-exposed line. Therefore it is necessary that each film frame be exposed during exactly 525 horizontal scans, usually two vertical scans interlaced, of the television screen and this dictates coordination between the shutter and the cathode ray tube so as to accomplish this length of exposure.

Previous methods of fulfilling the above phasing and coordination requirements have included use of a mechanical shutter controlled by the camera mechanism. This involved synchronizing the camera with the television transmitter or vice versa and necessitated the use of elaborate schemes for limiting the exposure to 525 lines, none of which was entirely satisfactory.

The present invention employs an electronic shutter started by the camera pulldown mechanism and stopped by the television equipment itself after a time corresponding exactly to 525 television horizontal lines. It thus inherently synchronizes the tube illumination with the camera operation, and it limits each frame exposure time to 525 lines.

The equipment described hereinafter for starting the shutter employs a coil and permanent magnet to generate electromagnetically a pulse signal which is representative of the phase and speed of the intermittent. However, it is obvious that one skilled in the art can easily devise other electromagnetic methods as well as electrostatic methods employing condensers and optical methods employing photocells for generating such a signal. Any such method may be employed in place of that described in the example given for illustration.

The provision of a method and apparatus for proper synchronization and phasing of the shutter under control of the camera and for proper coordination of the shutter with the television equipment are purposes of this invention.

It may be desired to photograph a television program for record purposes rather than for later motion picture projection. For such a purpose it may be adequate to photograph the television screen at a camera cyclic rate of less than 24 per second. For instance, one frame per second or one per five seconds may be adequate, or it may be desired to record only a single frame. It is therefore another purpose of this invention to provide a method and apparatus for accomplishing such single-shot and low-frequency operation.

This invention will be more readily understood from the following detailed description, considered together with the attached drawings in which.

Figure 1:
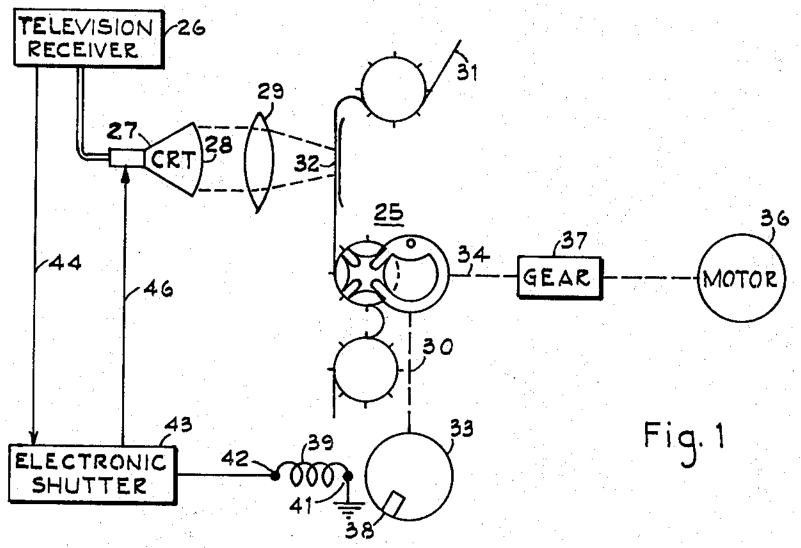
Figure 1 illustrates the general arrangement of equipment of the television recording apparatus.

In Fig. 1 a television receiver 26 and its associated cathode ray tube 27 are so positioned that the screen 28 of the latter when illuminated is projected by an optical system, represented schematically by the lens 29, onto a sensitized motion picture film 31 at the fixed position 32. The film 31 is contained within a motion picture camera and is intermittently drawn down by an intermittent mechanism 25. This mechanism is rotated once per camera cycle through a shaft 34 and reduction gear 37, by an electric motor 36. On an extension 30 of shaft 34 is placed a thick disc or wheel 33 of a nonmagnetic material, such as aluminum, into the edge of which has been embedded a permanent magnet 38. This wheel therefore rotates with the intermittent once per camera cycle. Close to the wheel 33 is positioned a coil of wire 39, so that the permanent magnet flux as it sweeps past and through the coil during the rotation of the wheel generates pulses of potential in the coil. The angular position of the coil 39 with relation to the position of the permanent magnet 38 is so designed in this example that an effective pulse of potential is generated in the coil immediately after the intermittent 25 has completed a pulldown operation, but other angular arrangements might be employed with corresponding circuit changes and still accomplish the purposes of this invention. One terminal 41 of the coil is grounded, the other terminal 42 is connected into an electronic shutter represented by rectangle 43. This shutter also receives horizontal synchronizing pulses through conductor 44 from the television receiver 26. Control of the times of start, termination and duration of the illumination and of blanking of the cathode ray tube 27 by the electronic shutter is indicated by conductor 46.

The function of the pulses emitted by the coil 39 is, through the electronic shutter 43, to initiate each period of illumination of the cathode ray tube 27. The shutter 43 thereupon counts 525 horizontal synchronizing pulses, then turns off the cathode ray tube screen illumination. The intermittent next advances the film by one frame and the process is repeated. It is obvious that the phase relation between the camera intermittent action and the cathode ray tube shuttering is determined by the angular design position of the permanent magnet 38 in the wheel 33, so may be made inherently optimum while the exact synchronism of the shutter with the camera is assured by the occurrence of the triggering pulse from the coil 39 once per revolution of the wheel. Perfect coordination between the shutter 43 and the television receiver 26 is assured by the utilization of the television horizontal synchronizing pulses as the time duration reference standards, and by the use of high speed circuits in the shutter which employ this standard to measure time from the beginning of any horizontal scan to the termination of the 525th scan thereafter.

Figure 2:
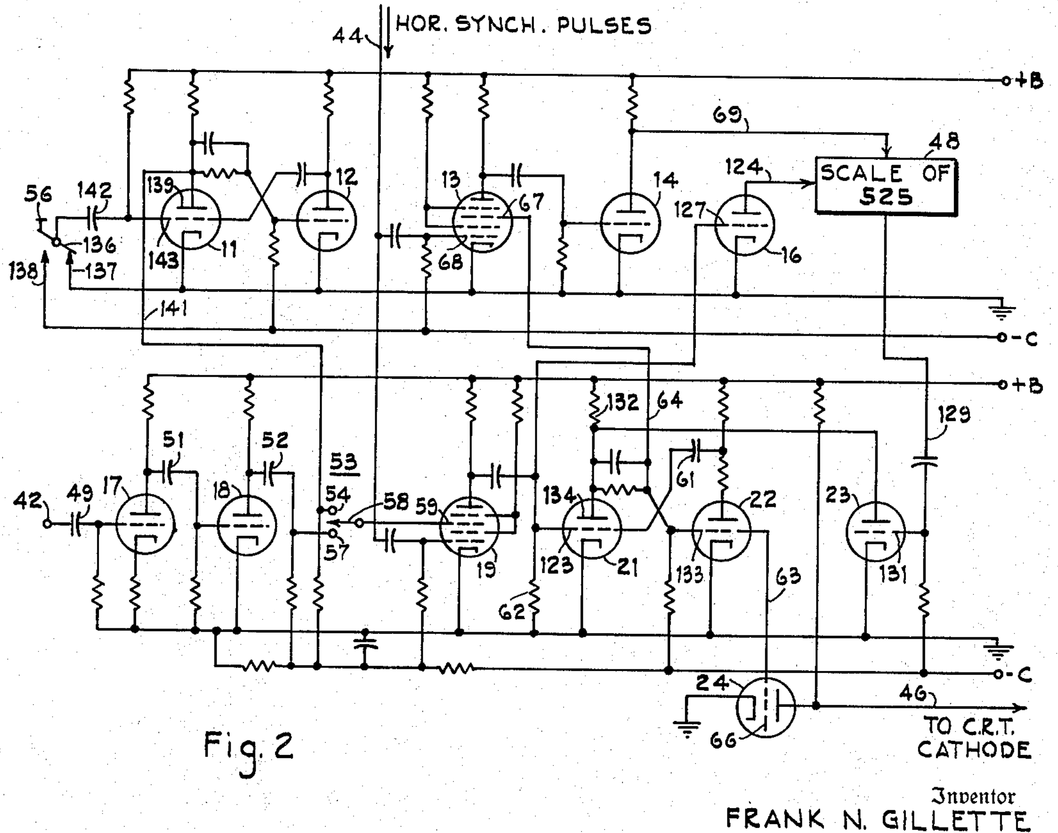
Figures 2 and 7 are schematic wiring diagrams of two types of electronic shutters.
Figure 3:
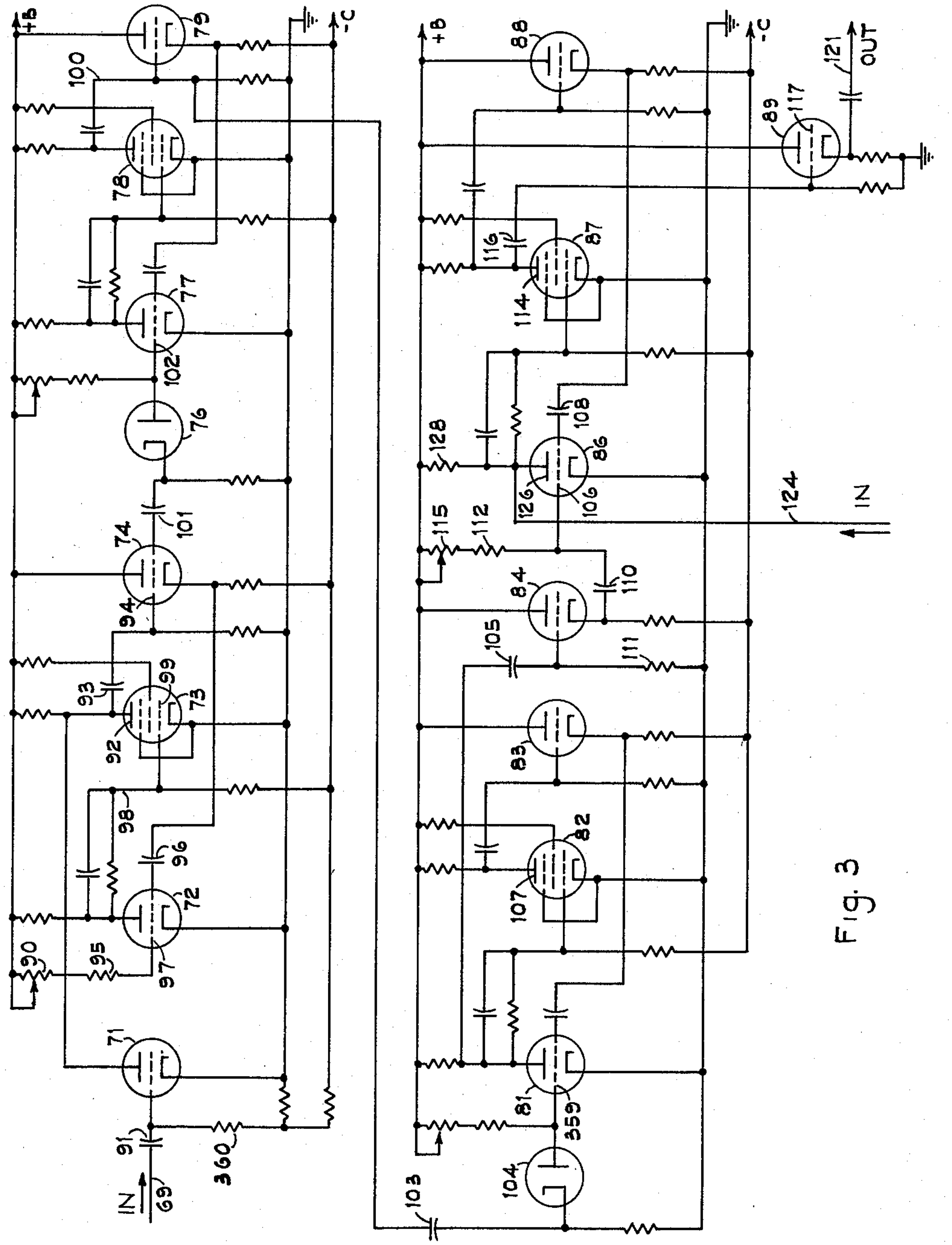
Figures 3, 8 and 9 are schematic wiring diagrams of three types of scale-of-525 counters.

Fig. 2 illustrates the schematic wiring of one type of electronic shutter 43 except that the included scale of 525 counting circuit is represented only by a rectangle 48, and is shown in full in Fig. 3. The camera pulses are received at terminal 42, Fig. 2 and are amplified in triodes 17 and 18, yielding at switch point 57 positive output pulses each of a duration greater than that of one horizontal scan. Switch 53 has two positions. When it is positioned on point 54 it arranges the circuit for single-shot operation in which individual single pictures may be taken under control of manual key 56 or of any equivalent manual or automatic arrangement. When switch 53 is on point 57 the shutter is arranged for motion picture photography of the television screen at the normal rate of 24 frames per second. The switch arm 58 is connected to the third grid 59 of a camera coincidence tube 19. This tube has large negative static biases on its first and third grids, therefore is normally cut off and will not conduct current until both grids are made positive. Camera pulses being positive, make the third grid positive for their duration, a period greater than 63½ μs. During this time a horizontal synchronizing pulse will be received over conductor 44, which is connected to the circuits of the television receiver as indicated in Fig. 1, the horizontal synchronizing pulses normally occurring at approximately 63½ μs intervals. The first horizontal pulse received causes tube 19 to conduct for the duration of the pulse resulting in a negative pulse being impressed from its plate on the grid of tube 21. This tube with tube 22 constitutes a single-stroke multivibrator having a period, controlled by the sizes of condenser 61 and resistor 62, substantially greater than 33,333 μs, the time of 525 horizontal synchronizing pulse periods. Tube 21 normally conducts, so that reception of a negative pulse by its grid makes this tube nonconducting and makes tube 22 conductive, triggering the multivibrator and starting its period running. When tube 21 plate current is stopped its plate rises to full positive potential, producing a step of positive potential on conductors 63 and 64. Conductor 63 energizes the grid 66 of an amplifying triode 24 which transmits from its plate through conductor 46 a negative step of potential to the cathode ray tube cathode, turning it on, illuminating its screen, and initiating the exposure of the motion picture frame 32, as indicated in Fig. 1. The positive step of potential is also led through conductor 64 to the third grid 67 of a gating coincidence tube 13. Since its first and third grids are strongly negatively biased, it normally conducts no current. The conductor 44 carrying horizontal synchronizing pulses is also connected to the first grid 68 of this tube, so that after the third grid has been made positive the first horizontal pulse thereafter will make the first grid positive and cause the tube to conduct for the duration of the pulse. The circuits involved are all fast, and the width of a horizontal pulse is 5 μs, so that the same horizontal pulse which has triggered the multivibrator also passes into the gating coincidence tube 13. The pulse output of this tube, inverted and amplified by triode 14, enters a scale-of-525 circuit 48 through conductor 69 as a positive pulse. Succeeding pulses corresponding to horizontal pulses continue to enter this circuit as long as the gating coincidence tube third grid is positive. The function of this scale-of-525 circuit is to count 525 horizontal synchronizing pulses and coincident with the 525th to emit a single positive pulse, the initiating pulse counting as the 0th pulse. On the 525th pulse the scale-of-525 circuit also cuts off the supply of horizontal synchronizing pulses to itself by releasing the single-stroke multivibrator.

One type of scale-of-525 circuit which may conveniently be used is schematically illustrated in Fig. 3. It consists of four stages in tandem, each stage consisting of a first trigger or clipping tube and a second, third and fourth tube constituting a three-tube single-stroke multivibrator. The stroke period of each stage is determined by the capacitance and resistance connected to the grid of the second tube. In practice it has been found that in the first stage consisting of tubes 71, 72, 73 and 74 the sizes of condenser 96 and resistors 90 and 95 should be such that the time constant determined by their product will cause return of the stage to its initial condition after the second received horizontal synchronizing pulse and before reception of the third. The stroke of this multivibrator should therefore be between 127 and 190½ microseconds in length. Likewise, the stroke of the second stage consisting of tubes 76, 77, 78 and 79 should be more than four input pulse periods in length and less than five, or between 762 and 952 μs., these input pulses being the pulses received from the first stage and constituting the output pulses thereof. The stroke of the third stage consisting of tubes 104, 81, 82 and 83 should have a length between 5715 and 6666 μs, and that of the fourth of approximately 33,333 μs.

Positive pulses enter the scale-of-525 counting circuit through conductor 69, Figs. 2 and 3. They are differentiated by condenser 91 and resistor 360, Fig. 3, amplified and inverted by triode 71, and impressed as strong negative pulses through condenser 93 on the grid 94 of the normally-conducting triode 74, stopping its plate current. The resulting negative surge from its cathode through condenser 96 makes the grid 97 of the normally-conducting triode 72 strongly negative, stopping its current flow. The resulting positive pulse through conductor 98 places a positive charge on the grid 99 of the normally-nonconducting pentode 73, starting the plate current in that tube. These actions constitute the start of the stroke of the first stage.

Meanwhile the initial negative charge placed on the grid 94 passes through condenser 101 and clipping tube 76 to the grid 102 of the normally-conducting tube 77 in stage two, stopping its plate current flow. The resulting positive pulse from its plate starts a current flow in the normally-nonconducting pentode 78, which in turn by impressing a negative pulse through conductor 100 on the grid of normally-conducting tube 79, stops its current flow. The cathode of the latter, now negative, impresses a timed saw-tooth step on the grid 102 of the triode 77, holding it nonconducting for the time period of the stage. These actions constitute the start of the stroke of the second stage.

Meanwhile the negative charge on the conductor 100 which has caused the grid of tube 79 to become negative also has passed to condenser 103 connected thereto. This occurs with negligible lapse of time after the initiation of the stroke of the second stage. The negative pulse passes through condenser 103 and third stage clipper tube 104, making the grid 359 of the normally-conducting tube 81 negative and stopping its plate current flow. The resulting positive pulse at its plate passes to the grid of the normally-nonconducting pentode 82, starting its plate current, and the resulting negative pulse from the plate 107 of the pentode, passing to the grid of the normally-conducting triode 83, stops its current flow. The resulting negative pulse from the cathode of the latter through the timing condenser impresses a saw-tooth step on the grid 359 of triode 81, holding it nonconducting for the time period of the stage. These actions constitute the start of the stroke of the third stage.

Meanwhile the negative pulse that started the stroke of the third stage, amplified and inverted by tube 81, passes as a positive pulse to condenser 105, where it is differentiated and passed to the grid of cathode follower tube 84. From the cathode of the latter the positive pulse is again differentiated by condenser 110 and the doubly differentiated pulse is transmitted to the grid 106 of the normally-conducting triode 86 of the fourth stage multivibrator. But this tube being already conducting, the positive pulse has no effect. However, the pulse having been doubly differentiated, it is followed by an overshoot or negative surge which does start the stroke of the fourth stage. The plate current flow of tube 86 is therefore stopped, and the resulting positive pulse at the plate 126 is transmitted to the grid of the normally-nonconducting pentode 87, starting its current flow. The resulting negative pulse at the plate 114 of the pentode is transmitted to the grid of the normally-conducting triode 88, stopping its plate current flow. The resulting negative cathode step produces through the timing condenser 108 a timed negative saw-tooth charge on the grid 106 of the triode 86, holding it nonconducting for the time period of the stage. The actions constitute the start of the stroke of the fourth stage.

A final cathode follower tube 89 is connected so that the potential changes of the plate 114 of the fourth stage pentode 87 are passed through it to the counting circuit output conductor 121. When the fourth stage stroke is terminated, signalizing the final count in a manner to be described, it will produce a positive pulse at the plate 114 and at output conductor 121.

The same positive pulse corresponding to a television horizontal synchronizing pulse which starts the stroke of the first stage, or a derived pulse which for the present purposes is simultaneous therewith, also starts the strokes of the second, third and fourth stages. If this be termed the 0th pulse, the third pulse thereafter again starts a stroke of the first stage, it having restored itself between the second and third pulse. The first and second pulses do not pass except in minor degree to the second stage because tube 73 is already conductive. However, the third pulse is passed to the second stage just as the 0th pulse was, but it finds tube 77 still nonconducting therefore does not affect the second stage.

Figures 4A, 4B, 4C:
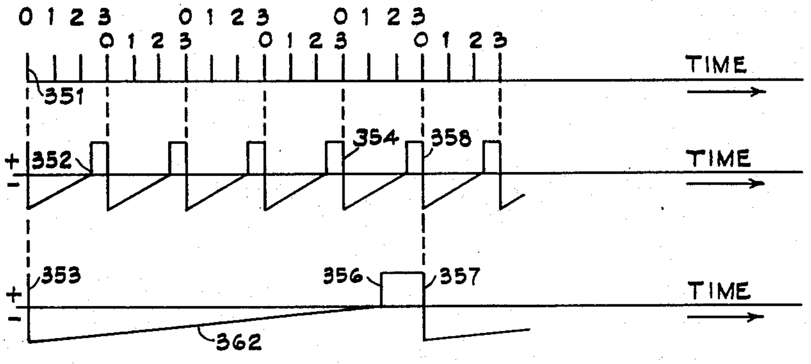
Figures 4A, 4B, 4C, 5A, 5B, 5C, 6A and 6B, illustrate by graphs the behavior of the counting circuit of Fig. 3.

The operation of the counter will be clarified by reference to Figs. 4A, 4B and 4C, showing the time relations of the pulses entering the first and second stage and of those leaving the latter. Upon arrival of an incoming 0th pulse at stage one at a time represented by mark 351, Fig. 4A, the grid 97 is made negative as illustrated in Fig. 4B, then slowly rises under control of the timing condenser 96 and resistances 90 and 95 to point 352 subsequent to the second pulse, when the first stroke terminates. The third pulse, Fig. 4A, then initiates a second stroke of the first stage, Fig. 4B and so on continuously.

Meanwhile the 0th pulse also initiates the first stroke of the second stage. This is represented by the line 353, Fig. 4C, indicating a sudden drop in potential of the grid 102 of triode 77. This grid slowly recovers as shown along sloping line 362, until subsequent to the time 354 of the fourth output pulse of the first stage it restores itself as indicated by the line of potential increase 356. The second stage is then in condition for a second stroke, which it starts at time 357 coincident with the initiation of the fifth stroke 358 of the first stage. At the beginning of each stroke, as at times 353 and 357, the second stage transmits a negative pulse to the third stage.

Figures 5A, 5B, 5C:
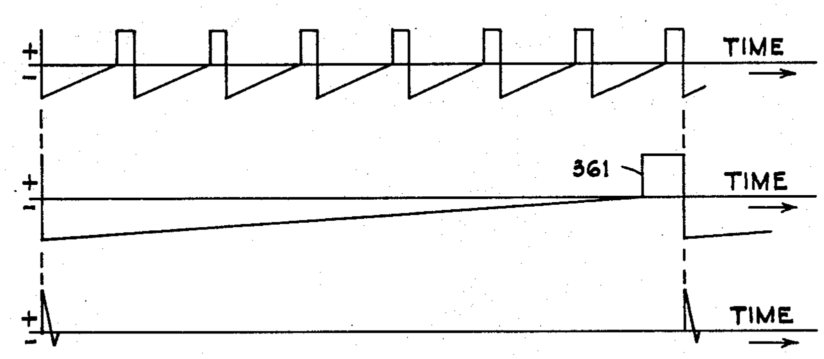

Fig. 4C is redrawn in Fig. 5A, showing to a smaller time scale the changes in potential of the grid 102 in stage two. In Fig. 5B are illustrated the changes in potential of the grid 359 of triode 81 of the third stage. Starting at a pulse coincident with initiation of a second stage stroke, this grid becomes negative and a stroke of the third stage starts. Its time period permits it to recover at time 361, after the sixth stroke of the second stage, so that the pulse marking the beginning of the seventh stroke of the second stage starts the third stage again. At the initiation of each third stage stroke a positive pulse and after double differentiation, a following negative overshoot pulse are emitted. These are illustrated in Fig. 5C as they appear at the grid 106 of triode 86 of the fourth stage.

Figure 6A:
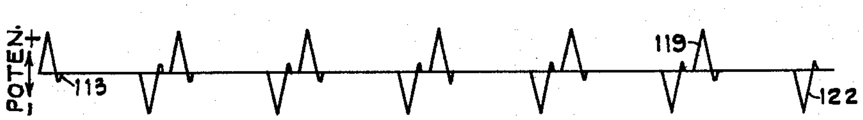
Figure 6B:
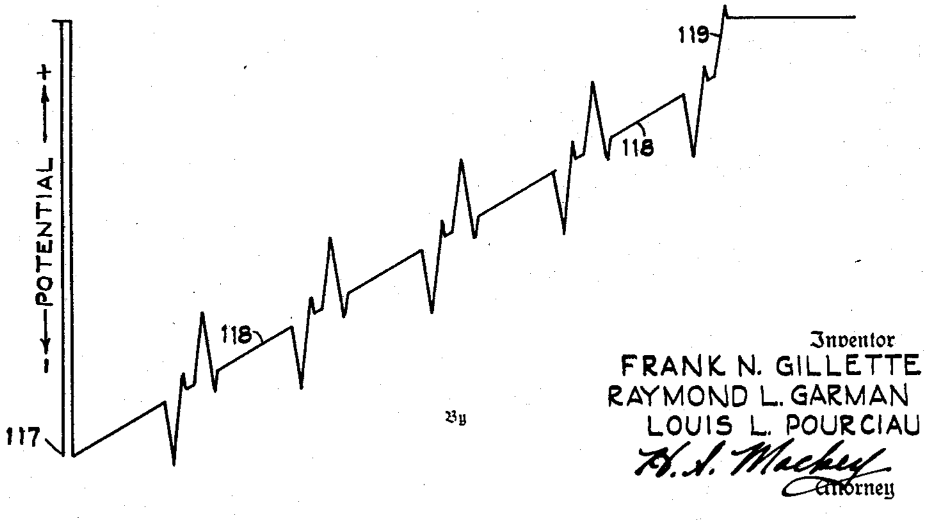

These pulses are repeated in Fig. 6A to a smaller time scale. Fig. 6B illustrates the changes in potential of the grid 106 of tube 86 in stage four, which differ from the grid changes in the other three stages. The stage does not restore itself before the count pulse is received, but is restored by the last counted pulse. Fig. 6B is drawn to the same time scale as Fig. 6A, and illustrates the drop of the potential of grid 106 to a low negative value indicated by reference number 117 caused by the first negative overshoot 113 of Fig. 6A. The potential of the grid 106 then slowly rises under control of the timing condenser 108 and timing resistances 112 and 115 as illustrated in Fig. 6B by the rising line 118. Upon this line of potential there are superimposed at regular intervals pulses of positive and negative potential coincident with and caused by the output pulses from stage three depicted in Fig. 6A. The fifth of these, indicated by reference number 119, occurs when the fourth stage has nearly recovered, so that it causes recovery or resetting of the stage. When this occurs tube 87 becomes nonconducting and a positive pulse is therefore impressed on the grid 117 of the output cathode follower tube 89, resulting in a strong positive output pulse on the counting circuit output conductor 121. This pulse is closely coincident in time with the 525th horizontal synchronizing pulse received by the counting circuit at its input conductor 69.

After termination of the 525-line period it is not desired to start the next such period of counting until time has been given for film pulldown, when emission of the wheel pulse again will trigger the counting circuit. During this time, approximately 8000 μs, the cathode ray tube will be unilluminated or blanked out. However, the same pulse which terminates the fourth stage also serves as an initiating or 0th pulse in the third stage as before described. That stage, after a time somewhat shorter than seven pulses, as illustrated in Fig. 4B, will complete its stroke and in doing so will emit a pulse which will appear at the grid 106 of tube 86 as a strong negative pulse, such as pulse 122 in Fig. 6A. This will initiate a false stroke of the fourth stage unless prevented. Prevention is accomplished by tube 16, Fig. 2, with its grid connected to the control grid 123 of the single-stroke multivibrator controlling the cathode ray tube illumination. The plate of tube 16 is connected through conductor 124, Figs. 2 and 3, with the plate 126 of the fourth stage triode 86, Fig. 3. During illumination of the cathode ray tube the single-stroke multivibrator comprising tubes 21 and 22 is on and its control grid 123 is negative, causing grid 127 of tube 16 to be negative also. This tube therefore draws no current and has no effect upon the scale-of-525 circuits. However, during blanking the single-stroke multivibrator is not on and its control grid 123 is at approximately zero potential, causing the triode 16 to conduct and to have a plate current drawn through plate resistor 128, Fig. 3, which it uses in common with tube 86. This drain prevents the emission of any large positive pulse from plate 126 of tube 86 when its grid 106 is made momentarily negative by reception of pulse 122, Fig. 5 at the termination of the preceding stage's stroke, and this drain thus prevents the initiation of a false stroke of the fourth stage.

The scale-of-525 circuit, in emitting its output pulse at the 525th counted horizontal pulse, stops the illumination of the cathode ray tube and also stops the flow of horizontal synchronizing pulses to its input terminal as follows. In Fig. 2 the scale-of-525 positive output pulse is emitted through conductor 129 and impressed on the grid 131 of the triode 23, which draws current through the plate resistor 132 which it uses in common with tube 21. This impresses a negative pulse on grid 133 of tube 22, stopping its plate current flow, starting the plate current of tube 21 and terminating the stroke of this multivibrator. A step of negative potential thus generated at the plate 134 of tube 21 is transmitted through conductor 63 to the grid 66 of the tube 24, inverted and amplified and impressed as a positive step of potential through conductor 46 on the cathode of the cathode ray tube, terminating its illumination and holding it blanked off. At the same time the negative step of potential from plate 134 through the conductor 64 stops plate current flow in tube 13, preventing further passage through it of the horizontal synchronizing pulses from conductor 44 to the scale-of-525 circuit 48.

This is the complete cycle of operations, and the cathode ray tube is held blanked until initiation by the next camera pulse of another similar cycle.

Single shot operation is effected by initiation of positive pulses similar to those applied in the above description by other means than by use of the coil associated with the intermittent. In such circumstances any motion picture camera with a"single-shot" mechanism, of which there are number commercially available may be used. In such a camera, by throwing a lever then depressing a spring-loaded button, single frames may be exposed successively at will. Such a camera may, for example, be equipped with a solenoid for depressing the "single-shot" button and the same electrical circuit is made to operate the electronic shutter of this invention as a single-exposure shutter, employing a delay circuit mechanism so that shutter operation occurs after the camera pull-down operation has been completed. Such a control circuit may be operated manually, or by employment of a timer at the rate of one frame per second or at any other desired rate.

The electronic shutter of the instant invention employs for single-exposure operation a switch diagrammatically illustrated by the manually operated key 56, Fig. 2. This key has an armature 136 normally in contact with a grounded normal contact 137. When the key is operated the armature 136 leaves the normal contact 137 and makes contact with operated contact 138 which is connected to a negative potential source. A multivibrator having a period of not less than approximately 200$\mu$s consists of normally-conducting triode 11 and normally-non-conducting triode 12, with the output potential from plate 139 connected through the conductor 141 to the switch point 54 of the switch 53. When the key 56 is operated, a negative charge flows from the negative potential source through contact 138, armature 136 and differentiating condenser 142 to the grid 143 of tube 11, stopping the current flow through this tube and starting a stroke of the multivibrator. A positive step of potential is thereby impressed through conductor 141 on point 54 of switch 53, and if this switch rests on point 54, the potential is transferred to grid 59 of tube 19. This tube is thus put in condition for passage of horizontal synchronizing pulses, and the illumination of the cathode ray tube for a single period equal in length to the period of 525 horizontal lines ensues in the manner above described. To make another exposure key 56 must be released and depressed again. During the duration of the stroke of the multivibrator the key 56 has no control, therefore to prevent false reepated illumination due to imperfect or vibrating contact of the key it may be desired to make the length of period of the multivibrator almost as great as the length of time desired to elapse between operations.

Figure 7:
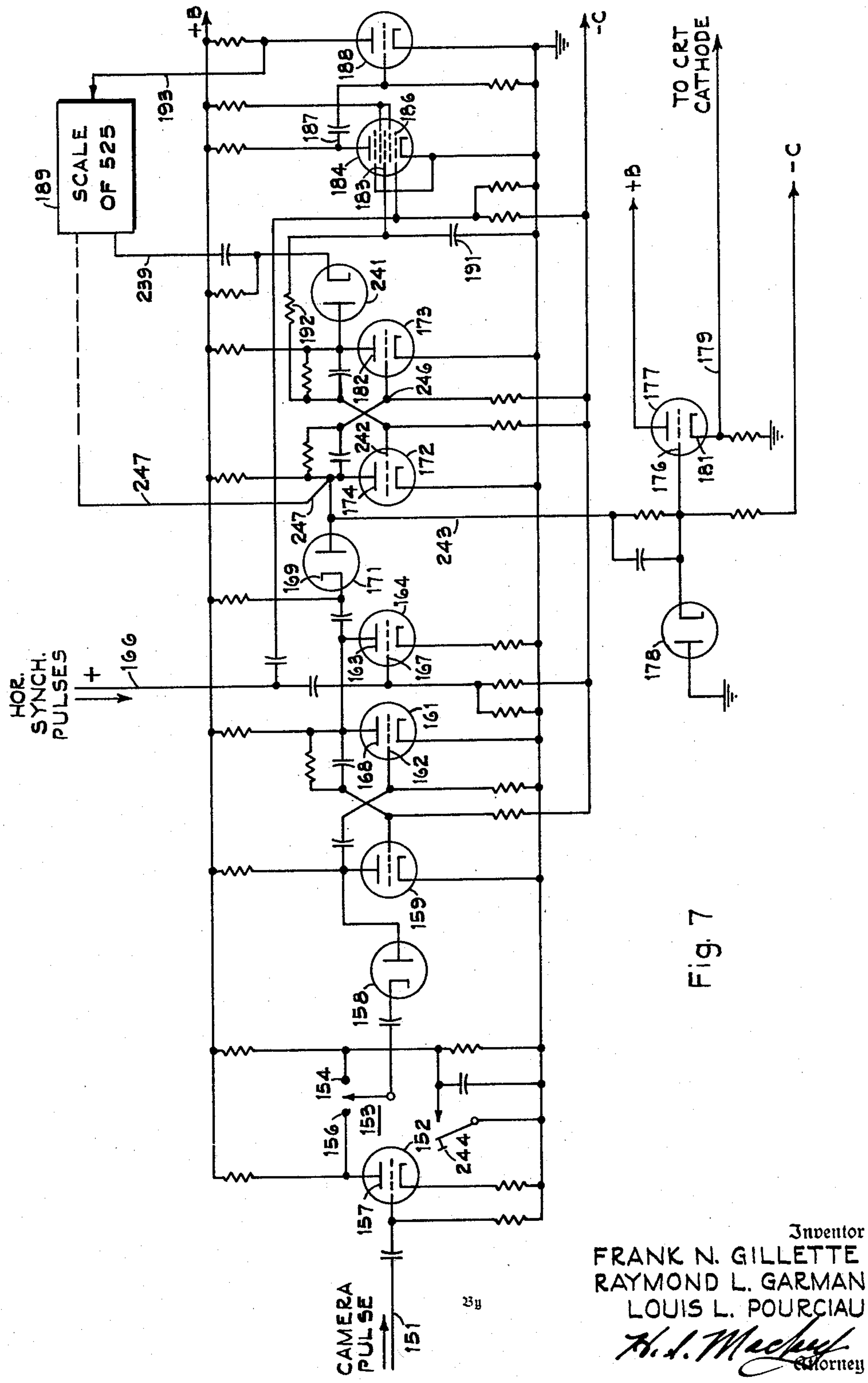
Figure 8:
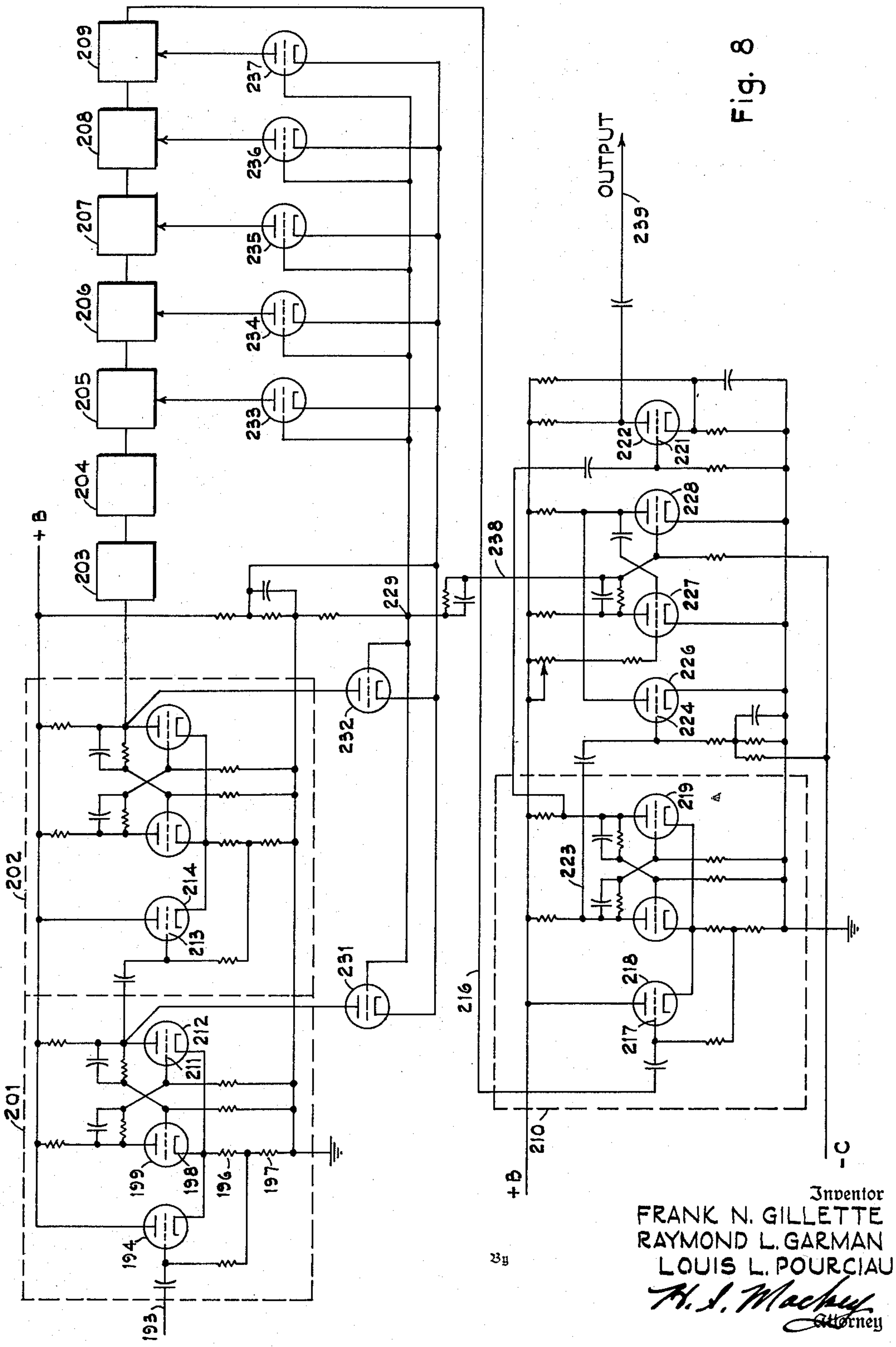

In Fig. 7 there is illustrated a modified form of gating circuit which may be used if desired and this circuit may cooperate with a modified scale-of-525 counting circuit as illustrated in Fig. 8. This circuit counts horizontal synchronizing pulses up to 512, then automatically resets itself to 499 and then counts 13 more synchronizing pulses thus producing an output pulse coincident with the desired 525th horizontal synchronizing pulse.

In Fig. 7 a positive pulse generated at the camera pulldown mechanism in the same manner as described in connection with Fig. 2 enters the circuit through conductor 151 and is amplified and inverted by amplifier tube 152. Switch 153 when on point 154 arranges the circuit for single-picture photography, and when on point 156 arranges the circuit for motion picture photography at the normal rate. In the latter case the negative pulse from plate 157 is clipped in diode 158 and starts a single-stroke multivibrator consisting of tubes 159 and 161 by placing a negative charge on the grid 162 of normally-on tube 161, stopping its conduction and making tube 159 conducting. A positive potential step is thereby applied to plate 163 of tube 164. Conductor 166 is connected to a source of positive horizontal synchronizing pulses within the television receiver, so that the next such pulse occurring after the plate 163 has become strongly positive places positive potential on grid 167 and the tube 164 becomes conductive. This lowers the potential of plate 168 of tube 161, terminating the multivibrator stroke and placing a negative potential step on the cathode 169 of the diode 171. This negative step, passing through the diode, starts plate current flowing in tube 172 and makes tube 173 nonconducting, these two tubes constituting a scale-of-two multivibrator, tube 173 being normally-conducting. The resulting negative step at the plate 174 of the tube 172 is conducted through connection 243 to the grid 176 of cathode follower tube 177 and makes it more negative. This grid 176 is normally about +50 volts positive and is held from going to less than zero potential when energized by the negative step by diode 178, which conducts to ground any potentials below zero potential. The diode 178 thus prevents any negative peaks from passing to the tube 177 and also eliminates any superimposed 60-cycle ripple. Conductor 179 applies the zero potentian level of the cathode 181 to the cathode of the cathode ray tube 27, Fig. 1, illuminating its screen.

When the scale-of-two multivibrator starts its stroke the plate 182 of the tube 173 becomes positive, placing a positive step of potential on the third grid 183 of the coincidence pentagrid tube 184. This action puts this tube in condition for passage of horizontal synchronizing pulses, so that the next to occur on conductor 166 makes the grid 186 positive and during its existence produces a negative pulse in conductor 187, which is inverted and amplified in tube 188 and passed as a strong positive pulse to the scale-of-525 circuit represented by the rectangle 189. Horizontal synchronizing pulses continue to pass through the coincidence tube 184 to the scale-of-525 circuit, the coincidence tube being kept in condition for their passage by the locked scale-of-two multivibrator. However, in the scale-of-525 circuit here employed it is desired not to retain the 0th pulse, therefore condenser 191 and resistor 192 are inserted to produce a slight time lag, so that the third grid 183 of the coincidence tube 184 is not made positive until after the energizing horizontal pulse has decayed, but is made positive before the next following horizontal pulse arrives.

Fig. 8 illustrates the schematic wiring of the modified form of the scale-of-525 counting circuit. It is composed of nine scale-of-two circuits identical in wiring but not necessarily so in sizes of components and indicated by the reference numbers 201, 202, 203, 204, 205, 206, 207, 208 and 209. The first two are explicitly shown in full, the remaining seven, being identical in wiring are represented only by squares. A tenth scale-of-two circuit 210 is similar but not identical.

When the gating coincidence tube 184 (Fig. 7) has been conditioned, positive horizontal synchronizing pulses flow into conductor 193, Figs. 7 and 8. It may be assumed that the left tube of each scale-of-two circuit of Fig. 8 as drawn is normally-conductive, that being the condition after the completion of a count. The first horizontal pulse causes current to flow in the trigger tube 194 and in the cathode resistors 196 and 197, so that the cathode 198 of the tube 199 becomes more positive relative to its grid, stopping current flow in that tube, causing the grid 211 of the tube 212 to become more positive so that tube 212 conducts. This produces a negative pulse at the grid 213 of the trigger tube 214, but since negative pulses do not affect the normally-nonconducting trigger tubes, no action in the second stage results. However, when the second horizontal pulse entering conductor 193 causes the first stage to return to its initial condition, a positive pulse to grid 213 triggers the second stage.

Thus the first stage produces a positive output pulse for every 2nd, 4th, etc. horizontal synchronizing input pulse; the second stage produces a positive output pulse for every 4th, 8th, etc., pulse input to the counter, and the ninth stage 209 will produce an output pulse at the 512th pulse.

This 512th pulse thus produces a positive pulse on conductor 216 to the grid 217 of the trigger tube 218 of the tenth stage, designated by the reference number 210. This pulse starts stage 210, causing the tube 219 to conduct and applying a negative pulse to the grid 221 of the inverter amplifier tube 222. But this tube being normally-nonconducting, no output pulse is caused. The operation of stage 210 also applies a positive pulse through conductor 223 to the grid 224 of the trigger tube 226. This triggers the short-period single-stroke multivibrator consisting of tubes 227 and 228, tube 227 being normally-conductive. The period of this multivibrator must be substantially less than one horizontal scan period because it must operate between the 512th and the 513th horizontal pulses. The function of this multivibrator and of the seven triodes designated 231, 232, 233, 234, 235, 236 and 237 is to reset the circuit so that it will count 13 more after counting 512, which is accomplished in the following manner: The triodes 233, 234, 235, 236 and 237 are connected to the stages 205, 206, 207, 208 and 209 respectively exactly as indicated in the first two stages 201 and 202, with the plate of each triode connected to the plate of the second tube of each stage. All seven triode grids are connected to a common point 229 in a potentiometer, one end of which is grounded and the other end connected through conductor 238 to the grid of tube 228. The seven triode cathodes are connected to a positive point in a second potentiometer which is equal in potential to the cathode potential of the tubes composing the counting stages.

When the single-stroke multivibrator is triggered, a positive step is thereby applied through conductor 238 to junction 229 and to all of the grids of the seven triodes, causing them all to conduct. At this time the 512th pulse having been received, all stages are in the initial condition with the first tube of each conducting. Therefore, when the seven triodes draw current and thereby make the grids of the first tubes in the associated stages more negative, these stages are triggered thereby into their other position. This occurs in the first, second, fifth, sixth, seventh, eighth and ninth stages. It will be found that when the stages have been so set, the 513th, 514th and subsequent pulses so affect the various stages that on the 525th pulse all stages emit positive pulses, the tenth stage 210 is reset also emitting a positive pulse, and this positive pulse is transmitted to the grid 221 of the output amplifier tube 222, resulting in a negative output pulse in the conductor 239.

Referring to Fig. 7 conductor 239 impresses this negative output pulse through a clipping diode 241 on the plate 182 of the second scale-of-two multivibrator tube 173. During the count of 525 this multivibrator has been set, with the first tube conducting. The 525th pulse now passing through diode 241, makes the grid 242 of tube 172 negative, making that tube nonconductive and making tube 173 conductive. This terminates the positive potential step on the third grid 183 of coincidence tube 184, terminating its conduction of horizontal synchronizing pulses to the scale-of-525 counter. The resetting of the scale-of-two multivibrator also produces a positive step in conductor 243 and in cathode follower output 179 to the cathode ray tube cathode, thereby terminating its illumination period and initiating its blank period.

For single-picture photography it is intended that the circuit shall be used in conjunction with a single-shot camera and auxiliary circuits if desired, as described above. For such use switch 153 has been provided with its position on contact 154 arranging the circuit for single-picture photography.

Operation of key 244 will then apply a negative pulse to the diode 158, causing operation of the single-stroke multivibrator consisting of tubes 159 and 161 and initiating the sequence of events thereafter as if the negative pulse had come from the camera and exactly as described supra for the switch position on point 156. The result will in the single-shot case be the illumination of the cathode ray tube for exactly 525 horizontal scan intervals, then blanking of the tube until the next closure of the key 244.

The scale-of-525 counting circuit illustrated in Fig. 8, after counting to 512, resets itself to 499. This takes a certain amount of time because of the delay action of the seven triodes, and if a faster operating circuit is desired the modification shown in Fig. 9 may be used. This circuit counts to 1024, then resets to 499 but does it during the blanking period. During the subsequent illumination period it counts from 499 to 1024, or a net amount of 525 pulses. This modification may be called the $2^{10}$ type of scale-of-525 and can be applied as illustrated in Fig. 7 with the addition of the conductor 247.

Figure 9:
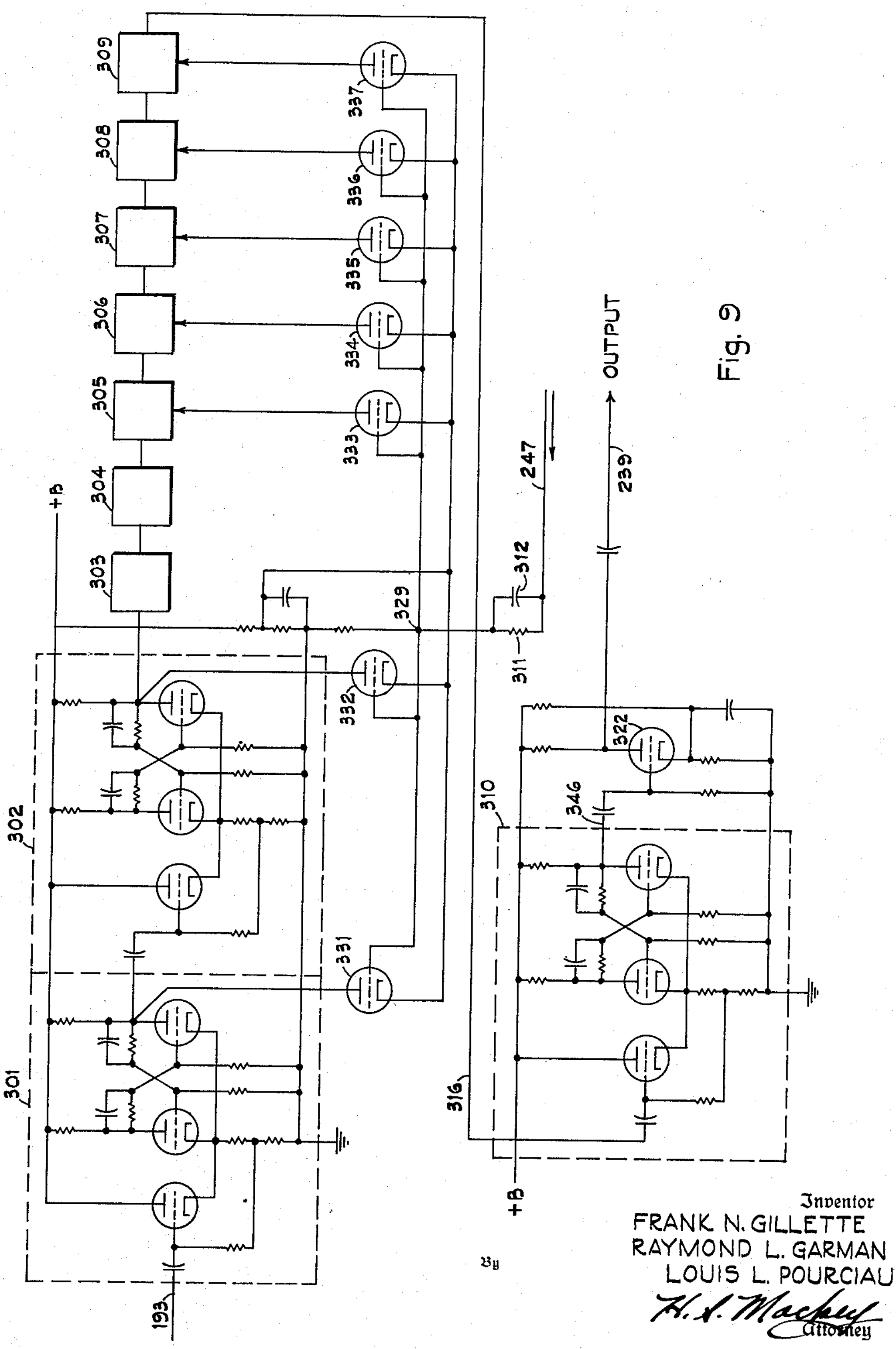

The scale-of-525 circuit illustrated in Fig. 9 is composed of ten identical scale-of-two circuits in tandem, numbered 301 to 310 inclusive. The first two and the last are shown schematically, the remainder, being identical, by rectangles only. Operation by successive division-by-two of the frequency of incoming pulses, beginning at conductor 193 carrying horizontal synchronizing pulses, is exactly as in the first nine stages of the scale-of-525 counter described in connection with Fig. 8, resulting in every 512th pulse being delivered by conductor 316 to the tenth stage 310, Fig. 9. This stage, being identical, again divides by two so that every 1024th horizontal synchronizing input pulse results in a positive step output at conductor 346 through amplifier inverter 322 and a negative pulse output through conductor 239 to the cathode of diode 241, Fig. 7. Operation thereafter as described in connection with Fig. 7 results in termination of the illumination period of the cathode ray tube and initiation of its blanking period. At this instant the scale-of-two multivibrator composed of tubes 172 and 173 enters its blanking position and the plate 174 becomes positive. In order to reset the type $2^{10}$ counter a connection is made to this plate, represented in Figs. 7 and 9 by conductor 247. This conductor through potentiometer 311, condenser 312 and common terminal 329 makes the grids of the seven resetting triodes 331 to 337 positive. These triodes in turn set stages one, two, five, six, seven, eight and nine, thus setting the counter in the condition it would be if it had counted 499 pulses. Meanwhile, however, the blanking period having begun, the coincidence tube 184, Fig. 7, has cut off the flow of horizontal synchronizing pulses through conductor 193 to the counter, so that it remains idle in the 499 count condition. Upon resumption of the flow of input pulses through conductor 193 at the initiation of the next illumination period, the counter commences counting as though from 499 and terminates as above described at 1024, thus counting a net amount of 525 horizontal pulses.

It is apparent that any of the three counting circuits as well as others, may be employed with either of the two gating circuits as well as others. One skilled in the art can easily make the necessary adaptations. For instance, the potential for the grid 127 of the amplifier 16 applying the inhibiting second input potential to the conductor 124 of Fig. 3 may be derived in Fig. 7 from the junction 246; the resetting potential required at conductor 247 in Fig. 9 may be derived in Fig. 2 from the grid 123 of the tube 21.

What is claimed is:

1. An apparatus for recording received television images in which the images displayed on a cathode ray tube screen are projected on a sensitized film strip comprising, a camera including an intermittent periodically advancing said film strip, a signal generator operated by said camera intermittent generating a signal of short time duration immediately succeeding the operation of the intermittent in advancing the film strip, means controlled by said generated signal for initiating the illumination of the cathode ray tube screen and means controlled by the received television horizontal synchronizing signals for terminating such illumination after a time interval corresponding to the time required to receive one complete television picture.

2. An apparatus for recording received television images in which the images displayed on a cathode ray tube screen are projected on a sensitized film strip comprising, a camera including an intermittent periodically advancing said film strip, counter means controlled by the received television horizontal synchronizing signals for terminating the illumination on the cathode ray screen after such a number of successive horizontal synchronizing signals have been impressed thereon as are contained in one complete television picture, a signal generator operated by said camera intermittent generating a signal immediately succeeding the operation of the intermittent in advancing the film strip and means controlled by said generated signal for initiating the illumination of the cathode ray tube screen and for initiating the operation of the counting means.

3. An apparatus for recording received television images in which the images displayed on a cathode ray tube screen are projected on a sensitized film strip comprising, a counting circuit controlled by successive received television horizontal synchronizing signals impressed thereon to count such number of said signals as are contained in one television picture and producing an output pulse at the termination of said counting operation, a camera including an intermittent periodically advancing said film strip, a signal generator operated by said camera intermittent generating a signal of short duration immediately succeeding the operation of the intermittent in advancing the film strip, means operated by said signal of short duration for initiating said counting operation and for illuminating the cathode ray tube screen and means controlled by the output pulse produced at the termination of said counting period for darkening said screen and for preventing the impression of horizontal synchronizing signals on said counting circuit.

4. An apparatus for recording received television images in which the images displayed on a cathode ray tube screen are projected on a sensitized film strip comprising, a camera including an intermittent periodically advancing said film strip, a multivibrator having two alternate conditions of operation in response to signals impressed thereon, a circuit interconnecting the output of said multivibrator and a control electrode of the cathode ray tube whereby in one condition of operation of said multivibrator said cathode ray tube screen is illuminated and in the other condition of operation of said multivibrator said screen is darkened, a counter circuit operative in accordance with successive received television horizontal synchronizing signals to count such number of said signals as are contained in one complete television picture and producing an output pulse at the termination of such counting operation, means operative by said multivibrator for initiating the counting operation of said counter circuit in the one condition of operation of said multivibrator and for terminating the counting operation in the other condition of operation of the multivibrator, a signal generator operated by said camera intermittent generating a signal immediately succeeding the operation of the intermittent in advancing the film strip, means operated by said signal for causing said multivibrator to assume its one condition of operation and means operative by the output pulse of said counting circuit for causing said multivibrator to assume its other condition of operation.

5. An apparatus for recording received television images in which the images displayed on a cathode ray tube screen are projected on a sensitized film strip comprising, a camera including an intermittent periodically advancing said film strip, a multivibrator having two alternate conditions of operation in response to signals impressed thereon, a circuit interconnecting the output of said multivibrator and a control electrode of the cathode ray tube whereby in one condition of operation of said multivibrator said cathode ray tube screen is illuminated and in the other condition of operation of said multivibrator said screen is darkened, a counter circuit operative in accordance with successive received television horizontal synchronizing signals to count such number of said signals as are contained in one complete television picture and producing an output pulse at the termination of said counting operation, a switch tube operated conjointly by a received television horizontal synchronizing signal and a potential produced by said multivibrator in its one condition of operation for impressing said synchronizing signals on said counter circuit to initiate its counting operation and operative by a potential produced by said multivibrator in its other condition of operation for preventing the imposition of said synchronizing signals on said counter circuit, a signal generator operated by said camera intermittent generating a signal immediately succeeding the operation of the intermittent in advancing the film strip, means operative by said signal for causing said multivibrator to assume its one condition of operation, and means operative by the output pulse of said counter circuit for causing said multivibrator to assume its other condition of operation.

6. An apparatus for recording received television images in which the images displayed on a cathode ray tube screen are projected on a sensitized film strip comprising, a camera including an intermittent periodically advancing said film strip, a multivibrator having two alternate conditions of operation in response to signals impressed thereon producing output signals of two different potential levels, circuit means for impressing said signals on a control electrode of the cathode ray tube whereby its screen is illuminated or darkened depending on the potential level of the signal impressed thereon, a signal generator operated by said camera intermittent generating a signal of short duration immediately succeeding the operation of the intermittent in advancing the film strip, means conjointly operated by said short duration signal and a received television horizontal synchronizing pulse for producing one condition of operation of said multivibrator, a counting circuit operative in accordance with successive received television horizontal synchronizing signals impressed thereon to count such number of said signals as are contained in one television picture and for producing at the termination of such count an output pulse, switch means operative in accordance with a signal produced by said multivibrator for impressing the horizontal synchronizing signals on said counter circuit in one condition of operation of said multivibrator and for preventing the imposition of signals on said counter circuit in its other condition of operation and circuit means interconnecting the output of said counter circuit and said multivibrator whereby the output pulse produced by said counter circuit at the termination of its counting period causes said multivibrator to assume its other condition of operation.

7. An apparatus for recording received television images in which the images displayed on a cathode ray tube screen are projected on a sensitized film strip comprising, a camera including an intermittent periodically advancing said film strip, a multivibrator having two alternate conditions of operation in response to signals impressed thereon, a circuit interconnecting the output of said multivibrator and a control electrode of the cathode ray tube whereby in one condition of operation of said multivibrator said cathode ray tube screen is illuminated and in the other condition of operation of said multivibrator said screen is darkened, a counting circuit operative in accordance with successive received television horizontal synchronizing signals to count such number of said signals as are contained in one complete television picture and producing an output pulse at the termination of said counting operation, a first switch tube operative conjointly by a received television horizontal synchronizing signal and a potential produced by said multivibrator in its one condition of operation for impressing said synchronizing signals on said counter circuit and operative in the other condition of operation of said multivibrator for preventing the imposition of synchronizing signals on said counter circuit, a signal generator operated by said camera intermittent generating a signal immediately succeeding the operation of the intermittent in advancing the film strip, a second switch tube operated conjointly by said generated signal and a received television horizontal synchronizing signal for impressing a signal on said multivibrator to cause it to assume its one condition of operation and means operative by the output pulse of said counter circuit for causing said multivibrator to assume its other condition of operation.

8. An apparatus for recording at selected time intervals received television images in which the images displayed on a cathode ray tube screen are projected on an intermittently actuated film strip comprising, a multivibrator having two alternate conditions of operation in response to signals impressed thereon, a circuit interconnecting the output of said multivibrator and a control electrode of the cathode ray tube whereby in one condition of operation of said multivibrator said cathode ray tube screen is illuminated and in the other condition of operation of said multivibrator said screen is darkened, a counter circuit operative by successive received television horizontal synchronizing signals to count such number of said signals as are contained in the scan of one complete television picture, said counting circuit producing an output pulse at the termination of said counting operation, means operative by said multivibrator when in its one condition of operation for initiating the counting operation of said counting circuit and for terminating the counting operation when the multivibrator is in its other condition of operation, signal generator means operable to generate signals at predetermined time intervals, means operative by the signals generated by said signal generator means for causing said multivibrator to assume its one condition of operation and means operative by the output pulse of said counting circuit for causing said multivibrator to assume its other condition of operation.

9. An apparatus for recording at selected time intervals received television images in which the images displayed on a cathode ray tube screen are projected on an intermittently actuated film strip comprising, a multivibrator having two alternate conditions of operation in response to signals impressed thereon, a circuit interconnecting the output of said multivibrator and a control electrode of the cathohde ray tube whereby in one condition of operation of said multivibrator said cathode ray tube screen is illuminated and in the other condition of operation of said multivibrator said screen is darkened, a counting circuit operative by successive received television horizontal synchronizing signals to count such number of said signals as are contained in the scan of one complete television picture, said countinng circuit producing an output pulse at the termination of said counting operation, a switch tube operated conjointly by a received television horizontal synchronizing signal and a potential produced by said multivibrator in its one condition of operation for impressing said synchronizing signals on said counting crcuit and operative by a potential produced by said multivibrator in its other condition of operation for preventing the imposition of said synchronizing signals on said counting circuit, signal generator means operable to generate signals at predetermined time intervals, means operative by the signals generated by said signal generator means for causing said multivibrator to assume its one condition of operation and means operative by the output pulse of said counting circuit for causing said multivibrator to assume its other condition of operation.

10. An apparatus for recording at selected time intervals received television images in which the images displayed on a cathode ray tube screen are projected on an intermittently actuated film strip comprising, a multivibrator having two alternate conditions of operation in response to signals impressed thereon, a circuit interconnecting the output of said multivibrator and a control electrode of the cathode ray tube whereby in one condition of operation of said multivibrator said cathode ray tube screen is illuminated and in the other condition of operation of said multivibrator said screen in darkened, a counting circuit operative by successive received television horizontal synchronizing signals to count such number of said signals as are contained in the scan of one complete television picture, said counting circuit producing an output pulse at the termination of said counting operation, a first switch tube operated conjointly by a received television horizontal synchronizing signal and a potential produced by said multivibrator in its one condition of operation for impressing said synchronizing signals on said counting circuit and operated by a potential produced by said multivibrator in its other condition of operation for preventing the imposition of said synchronizing signals on said counting circuit, signal generator means operable to generate signals at predetermined time intervals, a second switch tube operated conjointly by the signals generated by said signal generating means and a received television horizontal synchronizing signal for impressing a signal on said multivibrator to cause it to assume its one condition of operation and means operative by the output pulse produced by said counting circuit for causing said multivibrator to assume its other condition of operation.

11. An apparatus for recording received television images in which the images displayed on a cathode ray tube screen are projected on a sensitized film strip comprising: a camera including an intermittent for periodically advancing said film strip and an intermittent control mechanism, a signal generator operated by said camera intermittent control mechanism for generating a signal of short time duration immediately succeeding the operation of the intermittent in advancing the film strip, means controlled by said generated signal for initiating the illumination of the cathode ray tube screen, and means controlled by received television horizontal synchronizing signals for terminating such illumination after a time interval corresponding to the time required to receive one complete television picture.

12. A system for recording a complete set of scanning lines constituting each television image of a series of produced television images, comprising means for producing the television images sequentially, means for sequentially moving successive frames of a recording medium into position to record the produced images, an electronic counter for counting a set of scanning lines constituting a complete television image, means controlled from said recording medium moving means for initiating and maintaining a counting operation of said counter, blanking means for said means for producing television images, means for controlling said blanking means to discontinue its blanking action upon initiation of a count by said counter, means controlled by said counter for operating said count maintaining means to discontinue the count, means controlled by said counter for causing said blanking means to become operative to produce blanking, and means controlled by said counter to reset the counter in readiness for a new count.

References Cited in the file of this patent

UNITED STATES PATENTS 2,251,786 Epstein ---------------- Aug. 5, 1941

FOREIGN PATENTS 439,994 Great Britain ----------- Dec. 18, 1935